Patented Aug. 14, 1951

2,564,195

UNITED STATES PATENT OFFICE 2,564,195

STABILIZATION OF HIGH MOLECULAR WEIGHT ORGANIC MATERIAL CONTAINING INORGANIC ACID-FORMING ELEMENTS

Willem Leendert Johannes de Nie, Englewood, N. J., and Heino Tonnis Voorthuis, Amsterdam, Netherlands, assignors to Shell Development Company, Emeryville, Calif., a corporation of Delaware No Drawing. Application March 2, 1951, Serial No. 213,672. In the Netherlands September 26, 1946

6 Claims. (Cl. 260—45.8)

This invention relates to the stabilization of high molecular weight organic material containing inorganic acid-forming elements. More particularly the invention provides organic polymer compositions which have been rendered resistant to the changes in properties that are characteristic of such compositions without any substantial loss of transparency or moisture resistance. In its most specific embodiment the invention provides a method of inhibiting the formation of free inorganic acids within an organic mass by the thermo or photochemically induced decomposition of organic polymeric molecules to which are attached in organic acid residues.

Organic polymers and other high molecular weight organic materials are becoming increasingly important in commercial applications. A large and important class of such substances are high molecular weight organic materials in which the residues of inorganic acids, as halogen atoms, the sulfate, phosphate, nitrate and similar groups are attached to one or more atoms of complex organic molecules. Illustrative examples of such materials are the halogenation products of fats, train oils, waxes and the high boiling hydrocarbons, such as naphthalene, diphenyl, and the normally solid paraffins; the polymers and copolymers of the vinyl halides, the vinylidene halides, the halogenated dienes, the vinyl halide acetates, the halogen acrylonitriles, the halogen methacrylonitriles and the further reaction products of the polymers and copolymers of such materials with the halogens; the reaction products of the polymers and copolymers of the alkenes with the halogens; the reaction products of the polyunsaturated compounds such as the natural rubbers, gutta percha, balata, polymerization and copolymerization products of the dienes, the acetylene hydrocarbons, the vinyl acetylene hydrocarbons and the diacetylene hydrocarbons, and including the derivatives of there hydrocarbons with the halogens, $SO_2$, $P_2O_3$, $N_2O_3$, $H_2S$ and the hydrogen halides and the like. These organic materials with which the invention is concerned have molecular weights of at least 162.

The problem of reducing the tendency of such materials to split off molecules of an inorganic acid corresponding to the acid radical attached to the organic material is both serious and difficult of solution. For example, in the case of the halogen containing vinyl resins, the most desirable fabrication techniques require that the plastic material withstand temperatures approaching 200° C. during molding and forming operations, and many of the most desirable applications of the formed plastic materials require that they withstand the effects of direct exposure to sunlight and moisture. In other words, the most important uses of the materials often require their resistance to change under the very conditions most liable to induce the complex molecules to disintegrate.

It has long been known that the incorporation of a substance capable of combining with the inorganic acid as it is formed in such composition greatly improves the stability of the composition. White lead or basic lead carbonate, for example, has been found to present a partial solution of the problem and because of its low cost has been so employed on a large scale. However, inorganic stabilizers such as white lead are not soluble in the organic materials and must be finely dispersed in the solid form throughout the mass of organic material. Their employment, therefore, prevents the formation of transparent compositions and is not applicable for other than compositions which remain in the solid state. Numerous organic substances have been proposed, but the vast majority do not approach white lead in their stabilizing efficiency; further, many of them are too volatile to remain in the composition for a sufficient period of time; many are themselves rapidly decomposed or discolored photochemically while others cause cross-linking between the polymer chains, thus changing the thermoplastic characteristics of the polymers in the composition.

Certain organic compounds containing an epoxide group have been found to be effective thermostabilizers for high temperatures over short periods of exposure. The compounds heretofore proposed which contained this reactive grouping are the alkyl or aryl derivatives of the ethylene oxides. The lower molecular weight compounds of this type, however, are relatively volatile and will not remain in the plastic compositions for sufficiently long periods of time, and the higher molecular weight compounds, while having a sufficiently low volatility and thermo-stabilizing efficiency, are readily decomposed or discolored by light.

It is therefore a principal object of the present invention to provide a method of stabilizing high molecular weight organic materials containing acid forming elements by the incorporation of stabilizing materials which impart to the compositions a high resistance to thermal decomposition that is maintained over a long period of time and which is comparable to or better than that obtained by the employment of white lead without any substantial decrease in the transparency of the composition. Another object is the provision of thermoplastic compositions in which the formation of inorganic acids by the decomposition of polymeric molecules has been inhibited by the incorporation of a light stable organic substance having a very high boiling point. Another object is the provision of a halogen containing vinyl resin composition containing a stabilizer which is an oil soluble, water insoluble organic composition boiling at least above 300° C. and which composition exhibits an increased resistance to the effects of heat and/or light and exhibits properties of electrical resistance equal to or greater than the inherent properties of the resin. Still other objects and advantages of the invention will be apparent from the following description.

We have now discovered that, contrary to the general rule (that the presence of a plurality of functional groups attached to a single molecule causes a decrease in the resistance of the molecule to photochemically induced decomposition or discoloration), certain high molecular weight organic compounds containing two or more epoxide groups and having the structure defined below surprisingly exhibit a greater stability than compounds of an identical structure, but containing a single epoxide group.

The present invention provides means for increasing both the thermal and photochemical stability of high molecular weight organic material of the aforementioned type containing complex molecules to which are attached the residues of inorganic acids. The invention is particularly applicable for stabilization of organic material which contains halogen as a structural component and tends to release hydrogen halide with concurrent decomposition—e. g., polymers and copolymers of vinyl chloride. The inhibition of the heat and of the light induced deterioration of the organic materials is effected by incorporating and intimately admixing therewith about 0.1 to 3% by weight of complex glycidyl polyether obtained by etherifying an aliphatic polyhydric alcohol with an excess of epichlorohydrin in the presence of an acid-acting catalyst and dehydrochlorinating the product by reacting it with an alkaline material. The polyether is a complex epoxide obtained from a polyhydric alcohol such as propylene glycol, trimethylene glycol, butylene glycol, glycerol, sorbitol, mannitol, pentaerythritol and the like. The polyhydric alcohol is reacted with an excess of epichlorohydrin—i. e., with such a proportion of epichlorohydrin to polyhydric alcohol that there is more than 1 mol of epichlorohydrin per mol of the alcohol, and preferably there is used as many mols of epichlorohydrin per mol of polyhydric alcohol as there are hydroxyl groups in a molecule of the alcohol. Thus with glycerol, it is preferred to use three mols of epichlorohydrin per mol of glycerol. This reaction of the polyhydric alcohol with epichlorohydrin to form halohydrin polyethers is effected in the presence of an acid-acting catalyst. Suitable catalysts are the Friedel-Crafts catalysts such as aluminum trichloride, zinc chloride, boron trifluoride, and the like or high boiling inorganic acids such as sulphuric, phosphoric, and the like acids. The polyhalohydrin is then dehydrohalogenated in the presence of an alkaline reacting substance, such as the alkali metal hydroxides, aluminates, zincates, and the like to form a complex polyether containing a plurality of epoxide groups.

The preparation of a complex aliphatic ether having a polymeric structure is illustrated by the reaction of glycerol with epichlorohydrin.

Glycerol, 276 parts, and epichlorohydrin, 828 parts, (a 1:3 molar ratio) were placed in a reaction vessel having an external cooling means, and 1 part of 45% boron trifluoride ether solution diluted with 9 parts of ether was introduced. The temperature rose spontaneously and was maintained between 49° C. and 77° C. for about 1.5 hours by externally cooling the reaction vessel.

The reaction product was dehydrohalogenated by dissolving 370 parts in 900 parts of dioxane in the presence of 300 parts of sodium aluminate. The mixture was slowly heated to a temperature of 93° C., which was maintained for about 9 hours. The cooled mixture was filtered and the volatile components of the filtrate removed by distillation at 250° C. under 20 mm. pressure, leaving 261 parts of a pale yellow residue.

Considering one mole of hydrogen chloride in pyridine to be equivalent to one epoxide group, the product was found to have an average of 2.175 epoxide groups per molecule, calculated from a determined molecular weight of 324.

The complex ethers may be incorporated into the composition by a wide variety of suitable procedures. They may be introduced as solutions or dispersions in one or more of the reactants prior to the polymerization of the polymer, or they may be introduced subsequent to the polymerization reaction by any of the procedures suitable for the dispersion or solution of an additive ingredient into a plastic composition.

The complex polyethers employed as stabilizer in the compositions of the invention exhibit exceptional efficiency and therefore can be used in very small quantities. The amount of the stabilizing agent most suitable for a particular application will be governed by many factors. In any case, a stabilizing amount from about 0.1 to 3% by weight of the organic material being stabilized is used. Ordinarily, about 1 to 2% by weight of the stabilizer is used.

As an example of the invention, comparative thermal stabilization of polyvinyl chloride compositions was determined.

Compositions were prepared by hot milling at 270–300° F. from the following recipe wherein the parts are by weight. They differed only in the particular stabilizer employed:

| | Parts |
|---|---|
| Geon 101 (polyvinyl chloride) | 100 |
| Plasticizer (di-(2-ethylhexyl) phthalate) | 50 |
| Stabilizer | 2 |

The degree of discoloration upon aging is given in the following table in the form of extinction coefficients. This data may be considered relative and it should be remembered that the higher the value, the darker the sample. Samples with values above 10 are too dark to be measured accurately. Values on the commercial stabilizer marketed under the trade name V–1–N, which is described in "Modern Plastics Encyclopedia"

(1947) as a "stabilizer for vinyl resins against discoloration" and is believed to be strontium stearate, have been included for comparison. The stabilizer denoted by letter A was the complex polyether prepared as described hereinbefore from glycerol and epichlorohydrin.

| Time of Aging | A | V-I-N |
|---|---|---|
| EXTINCTION COEFFICIENT AFTER AIR AGING AT 160° C. | | |
| Control | 0.5 | 1.9 |
| 0.5 Hours | 1.3 | 2.1 |
| 1.0 Hours | 6.7 | 6.2 |
| 1.5 Hours | 3.3 | 10.5 |
| 2.0 Hours | 4.8 | 12.5 |
| 3.0 Hours | 5.3 | (¹) |
| EXTINCTION COEFFICIENT AFTER AIR AGING AT 100° C. | | |
| 7 Days | 1.3 | 9.5 |
| 14 Days | 1.5 | 10.4 |
| EXTINCTION COEFFICIENT AFTER AGING IN U. V. LIGHT | | |
| 170 Hours | 0.6 | 1.1 |
| 340 Hours | 0.6 | ² 0.6 |

¹ Very dark.
² Surface pitted.

This application is a continuation-in-part of our copending application, Serial No. 774,660, filed September 17, 1947.

We claim as our invention:

1. A composition of matter stabilized against the deteriorating action of heat and of light comprising organic material having a molecular weight of at least 162 which contains halogen as a structural component and tends to release hydrogen halide with concurrent decomposition in intimate admixture with about 0.1 to 3% by weight of complex polyether obtained by etherifying an aliphatic polyhydric alcohol with an excess of epichlorohydrin in the presence of an acid-acting catalyst and dehydrochlorinating the product by reacting it with an alkaline material.

2. A composition of matter stabilized against the deteriorating action of heat and of light comprising a polymer of a vinyl halide having a molecular weight of at least 162 in intimate admixture with from about 0.1 to 3% by weight of complex polyether obtained by etherifying an aliphatic polyhydric alcohol with an excess of epichlorohydrin in the presence of an acid-acting catalyst and dehydrochlorinating the product by reacting it with an alkaline material.

3. A composition of matter stabilized against the deteriorating action of heat and of light comprising polyvinyl chloride having a molecular weight of at least 162 in intimate admixture with from about 0.1 to 3% by weight of complex polyether obtained by etherifying an aliphatic polyhydric alcohol with an excess of epichlorohydrin in the presence of an acid-acting catalyst and dehydrochlorinating the product by reacting it with an alkaline material.

4. A composition of matter stabilized against the deteriorating action of heat and of light comprising organic material having a molecular weight of at least 162 which contains halogen as a structural component and tends to release hydrogen halide with concurrent decomposition in intimate admixture with about 1 to 2% by weight of complex polyether obtained by etherifying glycerol with an excess of epichlorohydrin in the presence of boron trifluoride and dehydrochlorinating the product with sodium aluminate.

5. A composition of matter stabilized against the deteriorating action of heat and of light comprising a polymer of vinyl chloride having a molecular weight of at least 162 in intimate admixture with about 1 to 2% by weight of glycidyl polyether obtained by etherifying glycerol with an excess of epichlorohydrin in the presence of boron trifluoride and dehydrochlorinating the product with sodium aluminate.

6. A composition of matter stabilized against the deteriorating action of heat and of light comprising polyvinyl chloride having a molecular weight of at least 162 in intimate admixture with about 1 to 2% by weight of glycidyl polyether obtained by etherifying glycerol with an excess of epichlorohydrin in the presence of boron trifluoride and dehydrochlorinating the product with sodium aluminate.

WILLEM LEENDERT JOHANNES DE NIE.
HEINO TONNIS VOORTHUIS.

No references cited.